United States Patent [19]
Machesney et al.

[11] Patent Number: 5,960,628
[45] Date of Patent: Oct. 5, 1999

[54] HYDRAULICALLY POWERED FAN AND POWER STEERING IN VEHICLE

[75] Inventors: Kerry A. Machesney, Centerville; Jeffrey J. Buschur, Bellbrook, both of Ohio

[73] Assignee: Valeo Electrical Systems, Inc., Auburn Hills, Mich.

[21] Appl. No.: 08/777,957

[22] Filed: Dec. 24, 1996

Related U.S. Application Data

[63] Continuation-in-part of application No. 08/680,482, Jul. 15, 1996, which is a continuation of application No. 08/400,927, Mar. 9, 1995, Pat. No. 5,535,845.

[51] Int. Cl.⁶ .................................................. F16D 31/02
[52] U.S. Cl. .............................. 60/424; 60/456; 91/516; 91/520
[58] Field of Search ........................... 60/422, 424, 456; 91/516, 520

[56] References Cited

U.S. PATENT DOCUMENTS

| | | |
|---|---|---|
| B 535,386 | 1/1976 | Eftefield . |
| 2,500,627 | 3/1950 | Chinn . |
| 2,585,348 | 2/1952 | Robinson . |
| 3,641,879 | 2/1972 | Week et al. . |
| 3,664,129 | 5/1972 | Schwab . |
| 4,005,636 | 2/1977 | Sunn . |
| 4,043,419 | 8/1977 | Larson et al. . |
| 4,075,840 | 2/1978 | Jesseivein . |
| 4,130,990 | 12/1978 | Amedei . |
| 4,144,946 | 3/1979 | Melocik . |
| 4,174,018 | 11/1979 | Liebert et al. . |
| 4,179,888 | 12/1979 | Goscenski, Jr. . |
| 4,189,919 | 2/1980 | Goscenski, Jr. . |
| 4,206,689 | 6/1980 | Peterson . |
| 4,223,646 | 9/1980 | Kinder . |
| 4,343,151 | 8/1982 | Lorimer ................................... 60/424 |
| 4,410,058 | 10/1983 | Symond . |
| 4,414,809 | 11/1983 | Burris ....................................... 60/424 |
| 4,420,934 | 12/1983 | Udono . |
| 4,446,697 | 5/1984 | Goscenski, Jr. . |
| 4,463,557 | 8/1984 | Miller et al. . |
| 4,470,259 | 9/1984 | Miller et al. . |
| 4,488,569 | 12/1984 | Rau . |
| 4,556,078 | 12/1985 | Wittren . |
| 4,625,751 | 12/1986 | Gage . |
| 4,664,210 | 5/1987 | Yamaoka et al. . |
| 4,738,330 | 4/1988 | Suzuki et al. . |
| 4,798,050 | 1/1989 | Nakamura et al. . |
| 4,941,437 | 7/1990 | Suzuki et al. . |
| 4,966,066 | 10/1990 | Kauss et al. . |
| 5,293,952 | 3/1994 | Ledamoisel et al. . |
| 5,398,505 | 3/1995 | Oogushi et al. . |
| 5,471,908 | 12/1995 | Lech . |
| 5,487,403 | 1/1996 | Mollo . |
| 5,584,640 | 12/1996 | Johnson . |

FOREIGN PATENT DOCUMENTS

| | | |
|---|---|---|
| 0042682 | 6/1981 | European Pat. Off. . |
| 3626013 | 7/1986 | Germany . |
| 62-282110 | 12/1987 | Japan . |
| 63-141878 | 6/1988 | Japan . |
| 03179133 | 8/1991 | Japan . |
| 1522014 | 8/1978 | United Kingdom . |
| 7901084 | 4/1979 | WIPO . |
| 9616259 | 5/1996 | WIPO . |

OTHER PUBLICATIONS

"Hydraulische Multiverbrauchersysteme", *Technische Rundschau*, No. 13, Mar. 29, 1983.

*Primary Examiner*—F. Daniel Lopez
*Attorney, Agent, or Firm*—J. Gordon Lewis

[57] ABSTRACT

A hydraulic system for use in an automotive vehicle. A source of hydraulic pressure selectively operates in two modes. In one mode, it feeds a radiator cooling fan and a power steering system in parallel when a system pressure or flow exceeds a predetermined pressure rate. In another mode, it feeds the radiator cooling fan and the power steering system in series when the system pressure or flow is less than the predetermined pressure or flow.

9 Claims, 5 Drawing Sheets

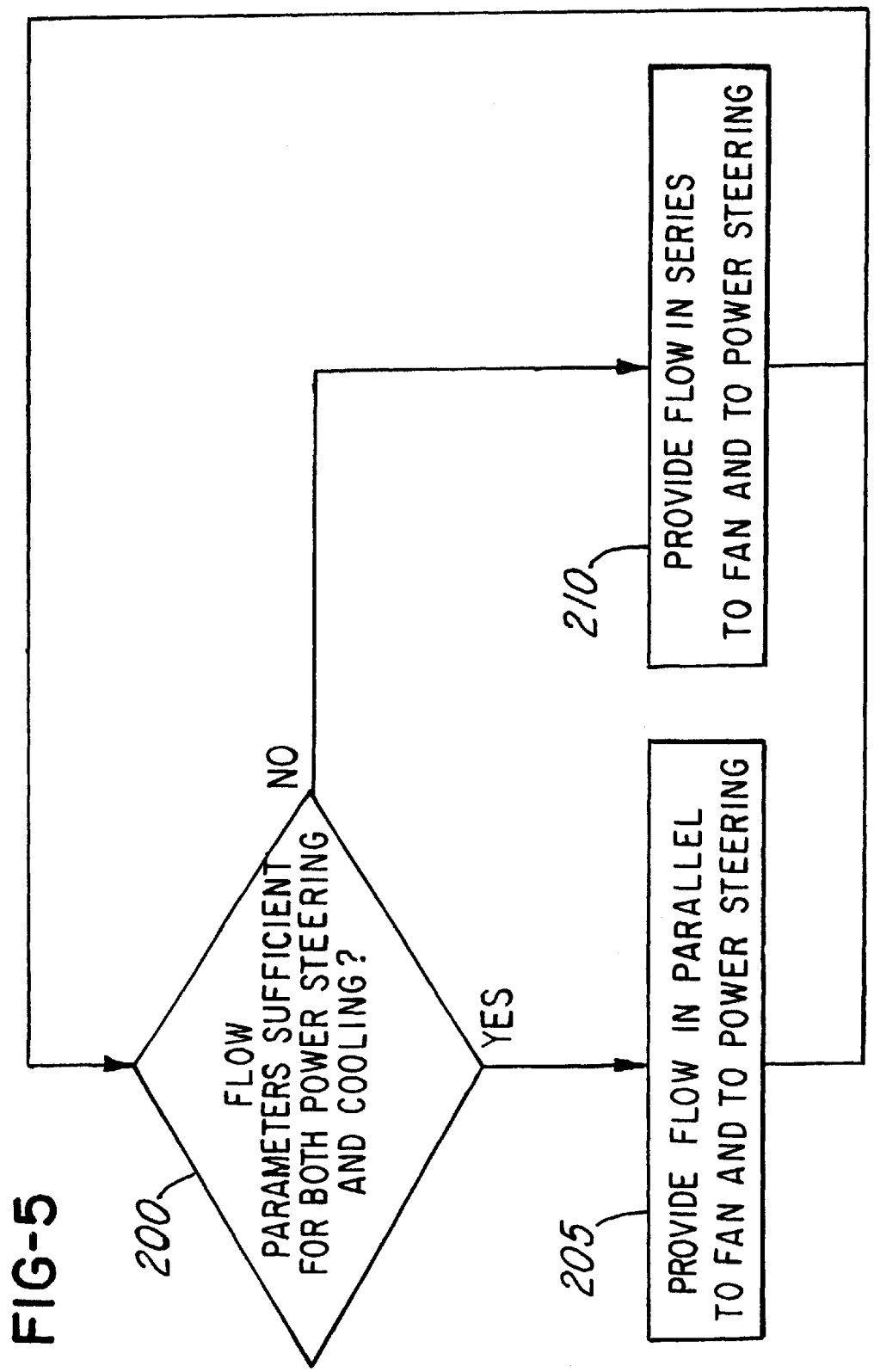

HYDRAULICALLY POWERED FAN AND POWER STEERING IN VEHICLE

CROSS-REFERENCE TO RELATED APPLICATION

This application is a continuation-in-part of application Ser. No. 08/680,482 filed Jul. 15, 1996, which is a continuation of application Ser. No. 08/400,927 filed Mar. 9, 1995, now issued as U.S. Pat. No. 5,535,845.

BACKGROUND OF THE INVENTION

1. Field of the Invention

The invention concerns a hydraulically powered fan for a radiator in a motor vehicle which shares a hydraulic power source with a power steering system.

2. Description of Related Art

In automotive vehicles, a fan commonly removes heat from liquid coolant, by pumping air over a heat exchanger, or radiator, through which the coolant flows. The fan is commonly driven directly by the engine through a power-transmission belt.

However, one problem with such direct-drive of the fan is that fan speed is linked to engine speed: as engine speed increases, the fan speed also increases. However, as engine speed increases, vehicle speed also generally increases. Increased vehicle speed increases the ram air flow through the radiator, which also cools the coolant, thereby reducing the need for fan cooling.

Thus, at high engine speed, in many cases, the fan runs at a high speed, but is not needed. Some fans are equipped with a clutch, which dis-engages them from the engine, at high engine speeds, to solve this problem.

However, even when this fan problem is solved, other factors exist which are undesirable. One is that fans are noisy. Each fan blade, as it passes an observer, delivers a small pressure pulse to the observer. As fan speed increases, the number of blade-passes occurring per second also increases, thereby increasing the number of pulses per second. That is, pulse frequency increases as fan speed increases. In addition, the magnitude of the pulses also increases as speed increases. Thus, a high-speed fan acts as a loud, high-frequency, noise source.

Another problem which arises is not so much attributable to the fan, as to automotive design principles. In a transversely mounted engine, the crankshaft is perpendicular to the direction of travel. However, the cooling face of the radiator is preferably perpendicular to the ram air stream, which is parallel to the direction of travel. If the disc representing the fan blades is parallel to the cooling surface of the radiator, then the fan's rotational axis is perpendicular to the crankshaft, causing complexity in transferring power from the crankshaft to the fan.

SUMMARY OF THE INVENTION

An object of the invention is to provide an improved cooling system in an automotive vehicle.

Another object of the invention is to provide a cooling system for an automotive vehicle in which power extracted from the engine to power a cooling fan is independent of engine speed.

Another object is to provide a hydraulic circuit which selectively operates in series or parallel as conditions require.

In one form of the invention, a hydraulic power source in an automotive vehicle supplies power to both a cooling fan and a power steering system, either in parallel, or in series, as conditions require.

In one aspect, this invention comprises a hydraulic system for use in a vehicle comprising a source of hydraulic pressure, a power steering system, a hydraulic fan system for cooling engine coolant and a switching system for selectively placing the power steering system and the hydraulic fan system in either a series configuration or a parallel configuration.

In another aspect, this invention comprises a method of delivering hydraulic fluid to components in a vehicle, comprising the steps of delivering flow in parallel to a cooling system and a power steering system during high flow situations and delivering flow in series to the cooling system and the power steering system during low flow situations.

In yet another aspect, this invention comprises a method of delivering hydraulic fluid to components in an automotive vehicle, comprising the steps of delivering flow to a cooling fan and a power steering system in series, measuring the flow, and when at least one flow parameter exceeds a threshold, delivering flow to the cooling fan and the power steering system in parallel.

Other object and advantages of the invention will be apparent from the following description, the accompanying drawings, and the appended claims.

BRIEF DESCRIPTION OF THE DRAWINGS

FIG. 5 illustrates logic implemented by one form of the invention.

SIMPLIFIED VIEW OF INVENTION

Figure 1:
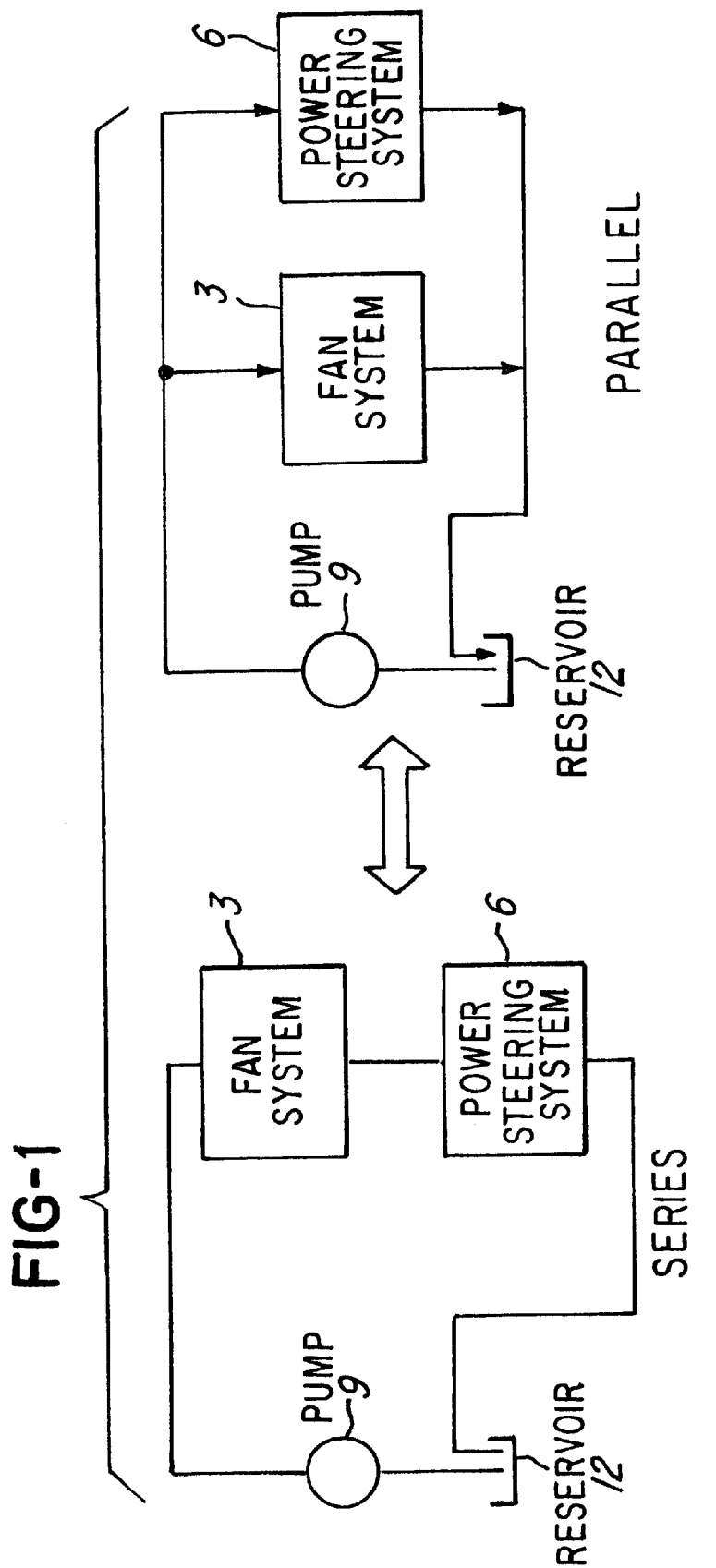
FIG. 1 illustrates an overview of operation of one form of the invention.

FIG. 1 illustrates a simplified overview of one form of the invention which is used in a motor vehicle. The invention switches between series operation, shown at the left as viewed in FIG. 1, and parallel operation, shown at the right.

The left side of FIG. 1 shows a group of components, including a fan system 3, which is used to cool engine coolant, and a power steering system 6. The fan system 3 and the power steering system 6 are powered by a hydraulic pump 9, which is powered by the engine of the vehicle (not shown).

On the left side of FIG. 1, the fan system 3 and the power steering system 6 are in series fluid connection. Fluid exiting the power steering system 6 is delivered to a reservoir 12 and which provides a supply of fluid to the pump 9.

The invention enables the series connection shown on the left side of FIG. 1 to be changed to a parallel connection, as shown in the right side of FIG. 1. A change between series and parallel operation can be desirable when the speed, and thus output, of the pump 9 changes, as caused by changes in engine speed of the vehicle.

For example, at low engine speeds, the volumetric output of the pump 9, in gallons per minute, is relatively low. Consequently, it is desirable to use the series arrangement shown on the left side of FIG. 1. The parallel arrangement, on the right side, is not desired, because, at low engine speeds, the share of the flow allocated to fan system 3 may not be sufficient because the power steering system 6 has priority.

On the other hand, at high engine speeds, sufficient flow is available to supply the fan system 3 and the power steering system 6, independently, and the parallel arrangement is preferred.

One advantage of parallel operation is that, at high speeds, the pump 9 may produce excess flow which would be otherwise wasted and converted to heat. By converting to the parallel operation shown on the right side of FIG. 1, some of the energy in the excess flow can be utilized.

Figure 2:
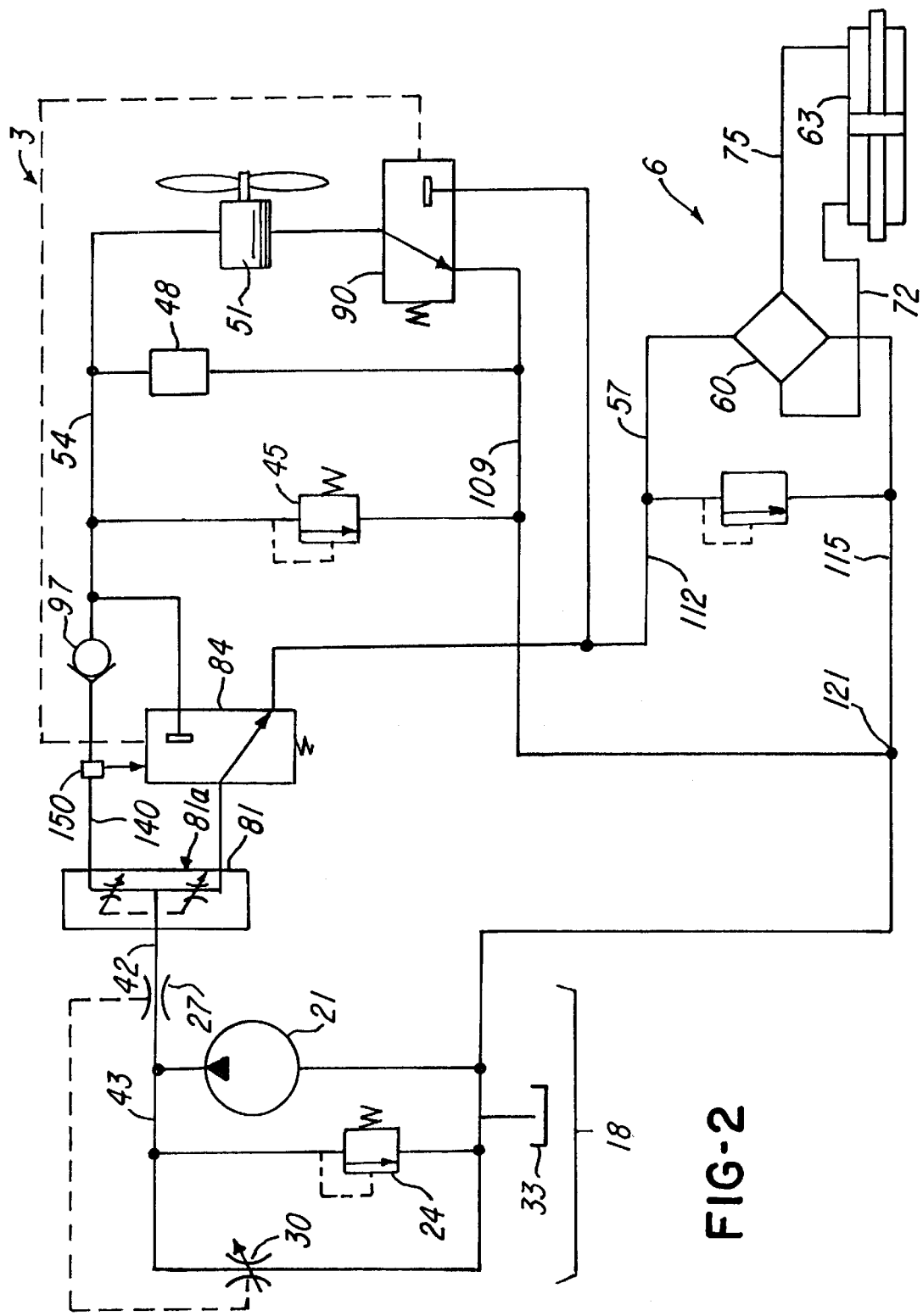
FIG. 2 illustrates one type of hydraulic circuitry which accomplishes the operation shown in FIG. 1.

Numerous types of arrangements can implement the embodiment shown in FIG. 1. FIG. 2 illustrates one type of hydraulic circuitry which accomplishes the implementation. The group of components 18 correspond to the pump 9 of FIG. 1. Components 18 include a fixed displacement pump 21, a relief valve 24, a pressure sensor 27, and an adjustable throttling valve 30 connected as shown.

"Fixed displacement" means, speaking generally, that every revolution of the rotor (not shown) of the pump 21 produces a given volume of output. That is, the amount of fluid which the pump "displaces" per revolution is fixed. Thus, at higher speeds, the pump produces a greater volume of output due to a greater number of rotations per second.

To accommodate the increasing fluid flow which occurs at higher speeds, sensor 27 directs the fluid flow through a venturi (not shown). The pressure sensed by the sensor 27 corresponds to the flow rate through the venturi. This pressure is fed to the variable throttle valve 30 which opens and closes according to a schedule (not shown), in response to the pressure sensed by sensor 27.

For example, when sensor 27 senses a low pressure, as at engine idle, the schedule may dictate or require adjustable valve 30 to remain closed, causing all of the output of the pump 21 to be delivered to line 42. At a higher speed, such as at 2,000 rpm, the schedule may dictate or require the adjustable valve 30 to open a significant amount, thus dumping a significant amount of flow into the reservoir 33.

The relief valve 24 acts as protection in the event that the output pressure in line 43 becomes excessive.

The overall operation of components 18 is conventionally known in that adjustable valve 30 opens and closes as output of the pump 21 changes in order to provide the proper flow rate in line 42.

The fan system 3 of FIG. 1 can be viewed as including three components of FIG. 2, namely: a fan motor 51, a fan speed control valve 48, and a relief valve 45. The relief valve 45 acts as protection in the event that the input pressure to the fan motor 51, in line 54, becomes excessive.

The fan speed control valve 48 controls speed of the fan motor 51 by causing fluid to bypass the fan motor 51. When the valve 48 is fully open, the system 3 is designed such that all fluid entering line 54 bypasses the fan motor 51. When the valve 48 is fully closed, all fluid entering line 54 enters the fan motor 51. At intermediate positions of valve 48, intermediate amounts of fluid reach the fan motor 51. Thus, assuming the relief valve 45 to be closed, as is the case in normal operation, the amount by which valve 48 is open controls the speed of the fan motor 51.

The power steering system of FIG. 1 can be viewed as including three components of FIG. 2, namely: a steering valve 60, a steering assembly 63, and a relief valve 66. The relief valve serves as protection in case the pressure to the input of the steering valve 60 in line 57 becomes too great. Ordinarily, the relief valve 66 is closed.

The steering valve 60 is a valve which selectively directs pressure to lines 72 and 75 to the steering assembly 63 to assist a driver of the vehicle in operating the vehicle.

Figure 3:
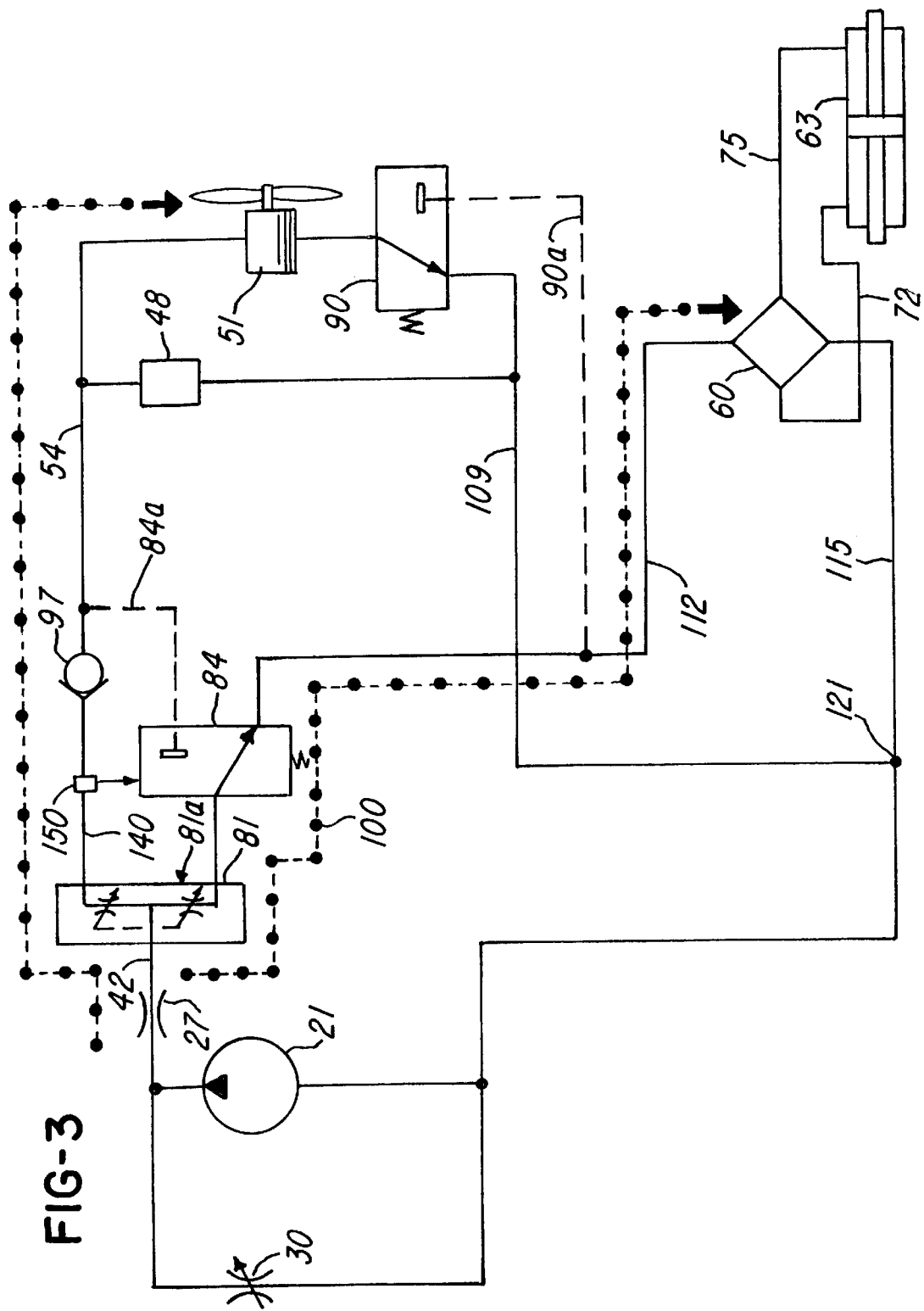
FIG. 3 illustrates how the hydraulic circuitry of FIG. 2 can accomplish the parallel operation shown in FIG. 1.

FIG. 3 illustrates how the hydraulic circuitry of FIG. 2 accomplishes the parallel operation of FIG. 1. In FIG. 3, selected components of FIG. 2 have been deleted to simplify the illustration described. The dashed lines 84a and 90a (FIG. 3) connecting to valves 84 and 90, respectively, represent fluid lines which are not used in the illustration of FIG. 3.

A priority flow divider 81 is actuated or positioned to allow flow indicated by the two dashed paths 100 and 103. The priority flow divider 81 is a conventional divider which can completely or partially block flow through its first outlet 81A, while permitting a flow predetermined at its second outlet 81B. When that predetermined flow reaches a threshold, such as a minimum flow rate, then the priority flow divided 81 opens to permit flow or more flow to its first outlet 81A. (Of course, if the initial flow through the second outlet 81B already exceeded the predetermined threshold, then flow through the second outlet 81A would never have been blocked.)

Flowpath 103 reaches the fan motor 51 and, from it, is directed to line 109 by outlet flow valve 90. From line 109, this flow returns to the reservoir 33.

Flowpath 100 is directed through inlet low flow valve 84, and reaches the steering valve 60, through line 112. After exiting the steering valve 60, the flow reaches line 115, which joins line 109 at junction 121, en route to the reservoir 33.

Figure 4:
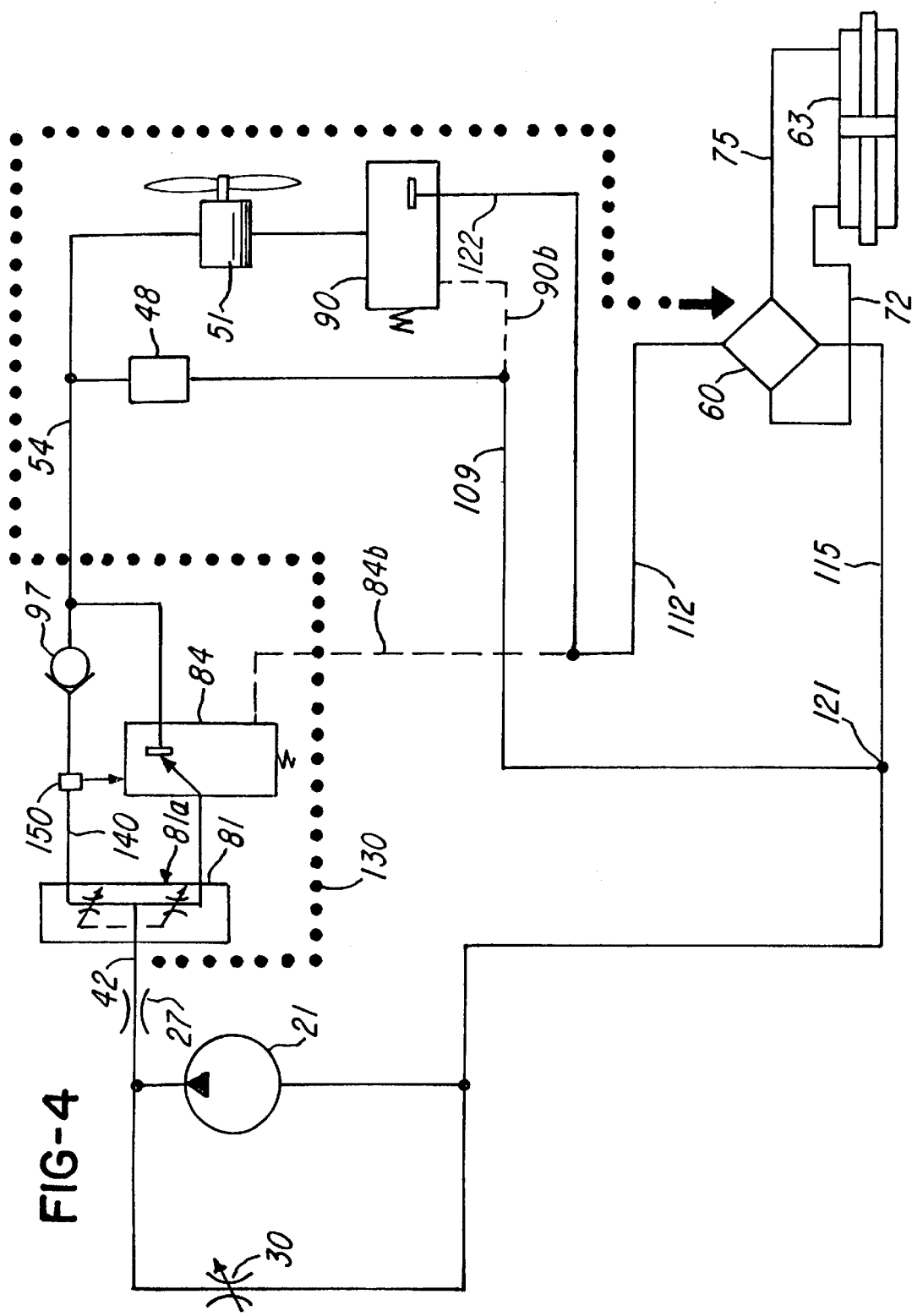
FIG. 4 illustrates how the hydraulic circuitry of FIG. 2 can accomplish the series operation shown in FIG. 1.

FIG. 4 illustrates how the hydraulic circuitry of FIG. 2 accomplishes the series operation of FIG. 1. In FIG. 4, selected components of FIG. 2 have been deleted, again to simplify the illustration. The dashed lines 84b and 90b connecting to valves 84 and 90, respectively, indicate fluid lines which are not used in the configuration of FIG. 4.

Priority flow divider 81 is actuated or positioned to pass only flow 130. No flowpath analogous to flowpath 103 in FIG. 3 is allowed. The allowed flow path 130 in FIG. 4 is directed to line 54 by inlet low flow valve 84.

From line 54, the flow reaches the fan motor 51 and upon exiting the fan motor 51, reaches outlet low flow valve 90, which directs the flow to line 122, which connects with line 112, which leads to the input of the steering valve 60. From the steering valve 60, the flow reaches line 115, and then reaches the reservoir 33.

Thus, it should be appreciated that the priority flow divider 81 has two operating states, namely, that shown in FIG. 3, where it delivers flow to both line 140 and valve 84, and that shown in FIG. 2, where it delivers flow only to valve 84. Inlet low flow valve 84 has the two states shown in FIGS. 3 and 4. However, only the two combinations shown in FIGS. 3 and 4 are used.

That is, for example, the position of valve 84 in FIG. 4, in combination with the position of valve 81 in FIG. 3 is not allowed. One simple reason for this particular disallowed state is that the position of check valve 87 would then be indeterminate.

Priority flow divider 81 delivers full flow to valve 84 in FIG. 4 until a predetermined flow is reached to valve 84. At that time, the priority flow divider 81 opens its excess flow port 81A and delivers flow to line 140. A pressure sensor 150 in FIG. 2 detects this flow and causes valves 84 and 90 to switch to the position shown in FIG. 3. Valves 84 and 90 are preferably coordinated, as indicated by dashed line 160 in FIG. 2, as by sharing a common spool. An example will explain the sequence of operation.

During engine idle, and low engine speeds, the series-flow situation of FIG. 4 exists. When flow through priority flow divider 81 to valve 84 reaches a predetermined threshold, as occurs when engine speed increases, the priority valve 81 opens its excess flow port 81A, generating flow in line 140 in FIG. 3. The pressure in line 140, sensed by sensor 150, causes valves 84 and 90 to switch to the parallel operation shown in FIG. 3.

One form of the invention can be viewed as a control system for switching a hydraulic system between the series and parallel states described herein. The preceding discussion has presumed that all signals were hydraulic signals and that these signals induced hydraulic switches, such as valve 81, to change state.

However, the invention is not limited to a purely hydraulic control system. Electronic pressure sensors can be used, for example, to detect when flow from priority flow divider 81 to valve 84 is sufficient to trigger opening of the excess flow port 81A. For example, sensor 150 in FIG. 2 can be an electronic pressure sensor. Although not shown, control system, such as a microprocessor-based control system, can receive the signals, process them, and actuate the appropriate valves 84, 90 and 81 shown in FIG. 2.

Irrespective of whether a purely hydraulic control system is used, or a combined electronic-hydraulic control system is used, FIG. 5 illustrates logic which the invention implements. In the case of a combined electronic-hydraulic control system, the ignition computer of the vehicle (also called the "on-board computer") can be used to perform the logic.

At decision block 200, it is determined whether flow is sufficient to supply the hydraulic fan system and the power steering system in parallel. If so, then the logic reaches block 205, indicating that parallel flow is provided, as by the hydraulic circuit of FIG. 3. If not, the logic reaches block 210, indicating that series flow is provided, as by the hydraulic circuit of FIG. 4. The logic then returns to block 200 and repeats.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A hydraulic system for use in a vehicle comprising:
   a fixed displacement pump for providing a source of hydraulic pressure;
   a power steering system in the vehicle;
   a hydraulic fan system for cooling engine coolant; wherein said power steering system being downstream of said hydraulic fan system and always receives flow during operation of the vehicle; and
   a switching system for selectively placing the power steering system and the hydraulic fan system in either a series configuration or a parallel configuration.

2. The hydraulic system of claim 1 wherein said switching system comprises an inlet low flow valve and an outlet low flow valve.

3. The hydraulic system of claim 1 wherein said switching system further comprises a priority flow divider coupled to at least one flow valve.

4. The hydraulic system of claim 3 wherein said switching system comprises a pressure sensor coupled downstream of said priority flow divider for actuating said flow valve in response to a sensed pressure to change between said series and parallel configurations.

5. A method of delivering hydraulic fluid to components in a vehicle, comprising the following steps:
   situating a power steering system downstream of a cooling system;
   delivering flow in parallel to said cooling system and said power steering system during high flow situations; wherein said power steering system always receives flow during operation of said vehicle; and
   delivering flow in series to the cooling system and the power steering system during low flow situations.

6. The method of claim 5 wherein said method further comprises the step of:
   determining if a system flow is sufficient to power both said power steering system and said cooling system.

7. The method of claim 5 wherein said method further comprises the step of:
   selectively switching between parallel and series delivery in response to a sensed pressure.

8. A method of delivering hydraulic fluid to components in an automotive vehicle, comprising the following steps:
   delivering flow to a cooling fan and a power steering system in series;
   measuring said flow, and when at least one flow parameter exceeds a threshold, delivering flow to the cooling fan and the power steering system in parallel; wherein said power steering system is downstream of said hydraulic fan system and always receives flow during the operation of the vehicle.

9. A hydraulic circuit for an automotive vehicle, comprising:
   a first line;
   a reservoir;
   a pump for drawing fluid from said reservoir and feeding fluid to said first line;
   a flow divider, which receives fluid from said first line, and selectively,
   i) delivers flow exclusively to a first low flow valve having first and second outlets; or
   ii) delivers flow both to the first low flow valve and to an excess flow port;
   a second line, which
   i) connects to said excess flow port, through a check valve which blocks flow from the second line into the excess flow port; and
   ii) connects directly to a first outlet of the first low flow valve;
   a third line, which connects to the second outlet of the first low flow valve;
   a fan speed control valve, connecting between the second line and the reservoir;
   a fan motor, connecting between the second line and an inlet of a second low flow valve, having first and second outlets,
   i) the first outlet of which connects to the third line; and
   ii) the second outlet of which connects to the reservoir;
   a power steering selector gear, connecting between the third line and the reservoir; wherein, in one mode of operation fluid flows in parallel from the flow divider, to the fan motor and the power steering valve; and
   in another mode of operation, fluid flows in series from the flow divider, to the fan motor, and thence to the power steering valve.

* * * * *